United States Patent

[11] 3,586,399

| | | | |
|---|---|---|---|
| [72] | Inventor | Martin Muller |   |
|   |   | Erlangen, Germany |   |
| [21] | Appl No | 810,653 |   |
| [22] | Filed | Mar. 26, 1969 |   |
| [45] | Patented | June 22, 1971 |   |
| [73] | Assignee | Siemens Aktiengesellschaft |   |
|   |   | Berlin, Germany |   |

[54] OIL-FREE BEARING ASSEMBLY WITH DEVICE FOR SUPPRESSION OF BEARING NOISE
8 Claims, 3 Drawing Figs.

[52] U.S. Cl. ................................................ 308/26, 310/90
[51] Int. Cl. ........................................... F16c 27/00, H02k 5/16
[50] Field of Search ............................................ 308/26; 310/90

[56] References Cited
UNITED STATES PATENTS

| | | | |
|---|---|---|---|
| 1,486,115 | 3/1924 | Allen | 308/26 |
| 1,323,626 | 12/1919 | Garman | 308/26 |
| 2,717,792 | 9/1955 | Pelley | 308/26 |
| 2,909,014 | 10/1959 | Walking | 308/26 |
| 3,215,479 | 11/1965 | Silver et al. | 308/26 |
| 3,273,948 | 9/1966 | Hoddy et al. | 308/26 |
| 3,391,290 | 7/1968 | Hahndorf et al. | 308/26 |
| 3,463,954 | 8/1969 | Latta | 310/90 |

Primary Examiner—William F. O'Dea
Assistant Examiner—Wesley S. Ratliff, Jr.
Attorneys—Curt M. Avery, Arthur E. Wilfond, Herbert L. Lerner and Daniel J. Tick ABSTRACT: An oil-free bearing assembly for the journaling of shafts, particularly those of canned or sealed electric motors, is equipped with means for suppressing noise in the bearing. The shaft is journaled in a fixedly held bearing bushing of synthetic plastic. A loosely mounted second bushing or similar structure of synthetic plastic engages the shaft, preferably in proximity of the fixed bushing, and is subject to the force of adjustable means for imposing upon the shaft a radial bearing pressure that minimizes the noise in the bearing.

OIL-FREE BEARING ASSEMBLY WITH DEVICE FOR SUPPRESSION OF BEARING NOISE

My invention relates to oil-free and virtually maintenance-free bearing assemblies of synthetic plastic material for the journaling of shafts, particularly those of small or midget-type electric motors within a can or sealed enclosure. By thus journaling the shafts of electrical machines and devices, the necessity for continual maintenance work is minimized and prolonged periods of useful life are obtainable.

However, it has been found that, due to the so-called slip-stick effect, such bearings of synthetic plastic tend to become noisy with fast-rotating shafts. This becomes manifest particularly when the radial load imposed upon the bearing drops below a given value. This occurs, for example, with hysteresis clutches, as are now increasingly employed in timers and the like switching clocks, as well as in metering instruments. The effect is particularly intensive in small motors with a diametrically magnetized rotor that is completely sealed from the environment, for example by a canned design of the motor construction. In consequence, the slip-stick effect considerably limits the use of synthetic plastic bearings as heretofore known.

It is an object of my invention, therefore, to provide a device for suppressing bearing noises for shafts that are journaled in oil-free bearings of synthetic plastic material, preferably for the shaft of diametrically polarized rotors in completely sealed or canned motors.

Another object of my invention, akin to the one mentioned, is to broaden the applicability of journal bearings made of synthetic plastic material by minimizing or virtually obviating the limitation heretofore imposed by the slip-stick effect.

According to the invention, the device for suppressing noise in oil-free bearings of plastic material is so designed and arranged as to afford exerting upon the journaled shaft a given radial bearing pressure, or a pressure which reliably exceeds the minimum needed for effective noise reduction. Preferably, the device acts directly upon the shaft in proximity to the bearing of synthetic plastic material. It is, of course, desired to have the device that produces the radial bearing pressure, likewise operate completely without oil or liquid lubricant and virtually free of wear. For this reason, the parts coacting directly with the shaft are preferably also made of an oil-free synthetic plastic.

According to another feature of my invention, a preferred embodiment comprises a bushing of synthetic plastic which constitutes a fixed bearing and a further bushing, likewise made of synthetic plastic, which is loosely shoved upon the shaft so as to be situated beside the fixed bushing, the loose bushing being placed under the action of a radially acting spring. To reduce the number of components, it is further preferable to give the fixed and the loose bushings the same design and the same shape and to jointly accommodate them within a single bearing shell.

In cases where the bearing properties of the synthetic plastic do not permit or facilitate properly and tightly guiding and seating the two bushings in immediate proximity to each other, some distance between the two bushings can be secured simply by giving the loose bushing, and accordingly the bore in the bearing shell, a slightly larger outer diameter than the fixed bushing, thus providing for reliable lateral guidance of the loose bushing in the shell.

The reduction in torque due to the radial bearing pressure is not appreciable because the available torque, as a rule, is only partially utilized.

The invention will be further described with reference to embodiments of noise-suppression bearings according to the invention illustrated by way of example in the accompanying drawings, in which.

The same reference numerals are used in all illustrations for corresponding items, respectively.

Figure 1:
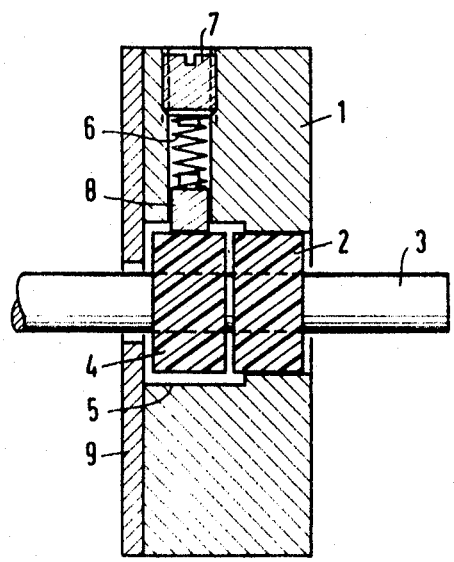
FIG. 1 is a sectional view of a first embodiment.

Denoted by 1 is a bearing shell which may have a single-piece of two-piece design in the conventional manner. A bushing 2 of synthetic plastic is mounted in the bore of the bearing shell 1 and is traversed by a shaft 3 to be journaled without the use of oil or other liquid lubricant. Another bushing 4 of synthetic plastic is shoved upon the shaft 3 and can freely move in another bore 5 whose diameter is slightly larger than that of the bore accommodating the bushing 2. For exerting a radial pressure upon the shaft, the bushing 4 is acted upon by a spring 6 whose effective force can be varied and thus adjusted by means of a setscrew 7. The spring 6 may act directly upon the bushing 4 or, as shown, indirectly through the intermediate member 8. A shield 9 covers and closes the bearing. By changing the setting of the screw 7, the pressure imposed upon the shaft 3 is varied until the shaft runs quietly in the bearings.

Figure 2:
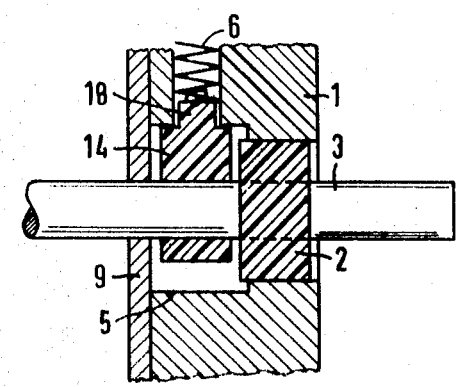
FIG. 2 shows partly a corresponding sectional view of a second embodiment.
Figure 3:
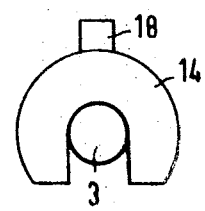
FIG. 3 is a lateral elevation of a loose bushing-type structure according to FIG. 2.

The radial pressure upon the shaft 3 may also be produced in other ways. For example, in lieu of giving the pressure structure 4 the shape of a closed ring or bushing as shown in FIG. 1, a pressure piece of arcuate shape as shown at 14 in FIGS. 2 and 3 may be employed. This pressure piece 14 has a projection 18 which corresponds to the member 8 in FIG. 1 and serves to prevent tangential or rotational movement of the pressure structure 14. In lieu of the helical pressure spring 6, a leaf spring or a pull spring may be employed.

In the embodiments shown on the drawing, the fixed bushing 2 and the loose bushing 4 or 14 are disposed in the bearing shell. However, both bushings or bearing structures may also be accommodated directly in a structural portion of an apparatus or appliance, in a bearing shield of a motor, or in any other suitable support. The invention, furthermore, is not limited to bearing bushings consisting entirely of synthetic material but are also applicable to bearings of synthetic-and-foil material. Upon a study of this disclosure, such and other modifications will be obvious to those skilled in the art without departing from the essential features of my invention as set forth in the claims annexed hereto.

I claim:

1. With an oil-free bearing assembly of synthetic plastic for the journaling of shafts, in combination, a device for suppressing bearing noises comprising a shaft, a substantially fixed bearing structure of synthetic plastic surrounding said shaft in journaling engagement therewith, another structure of synthetic plastic engageable with said shaft and displaceable radially thereof, and adjustable force means for imposing upon said latter structure a force having a radial bearing-pressure component for reducing noise.

2. In a bearing assembly according to claim 1, said other structure being located immediately adjacent to said bearing structure.

3. In a bearing assembly according to claim 1, said bearing structure being a bushing and said other structure being a bushing loosely seated upon said shaft, said force means comprising a spring actuable upon said loosely seated bushing in the radial direction.

4. In a bearing assembly according to claim 1, said force means comprising an adjustable abutment in engagement with said spring whereby said pressure component can be varied.

5. A bearing assembly according to claim 3, comprising a bearing shell, said loose bushing and said fixed bushing being both accommodated in said same shell.

6. In a bearing assembly according to claim 5, said two bushings being identical as to shape and size.

7. In a bearing assembly according to claim 5, said other structure for providing radial pressure having a diameter slightly larger than the diameter of said bearing structure, and said bearing shell forming a lateral guide for said other structure.

8. In a bearing assembly according to claim 1, said other structure having an arcuate shape and having a projection in engagement with said force means, and fixed guide means engageable with said other structure to prevent rotation thereof.